(12) United States Patent
Kinoshita et al.

(10) Patent No.: US 7,871,680 B2
(45) Date of Patent: Jan. 18, 2011

(54) OPTICAL FILM AND LIQUID-CRYSTAL DISPLAY DEVICE

(75) Inventors: Ryoji Kinoshita, Osaka (JP); Tishihiko Ariyoshi, Osaka (JP); Seiji Umemoto, Osaka (JP); Yuuki Nakano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 1254 days.

(21) Appl. No.: 10/096,935

(22) Filed: Mar. 14, 2002

(65) Prior Publication Data
US 2002/0187284 A1 Dec. 12, 2002

(30) Foreign Application Priority Data
Mar. 15, 2001 (JP) .................. P2001-073243

(51) Int. Cl.
*C09K 19/00* (2006.01)
(52) U.S. Cl. ............... 428/1.3; 428/1.1; 428/411.1; 428/516
(58) Field of Classification Search ............ 428/1.1, 428/1.3, 411.1, 516
See application file for complete search history.

(56) References Cited

U.S. PATENT DOCUMENTS

| | | | | |
|---|---|---|---|---|
| 4,374,612 A | * | 2/1983 | Matsumura et al. | 396/288 |
| 4,856,857 A | * | 8/1989 | Takeuchi et al. | 359/3 |
| 5,903,391 A | * | 5/1999 | Toshima et al. | 359/599 |
| 6,027,220 A | * | 2/2000 | Arai | 362/19 |
| 6,086,790 A | * | 7/2000 | Hayashi et al. | 252/200 |
| 6,097,514 A | * | 8/2000 | Nishikawa | 359/12 |
| 6,159,608 A | * | 12/2000 | Friedman et al. | 428/442 |
| 6,259,496 B1 | * | 7/2001 | Kashima | 349/62 |
| 6,379,017 B2 | * | 4/2002 | Nakabayashi et al. | 362/619 |
| 2001/0010630 A1 | | 8/2001 | Umemoto | |
| 2001/0012159 A1 | | 8/2001 | Umemoto et al. | |
| 2001/0020984 A1 | | 9/2001 | Umemoto | |

FOREIGN PATENT DOCUMENTS

| | | |
|---|---|---|
| EP | 1 111 440 A2 | 6/2001 |
| EP | 1 113 310 A2 | 7/2001 |
| EP | 1 122 586 A2 | 8/2001 |

(Continued)

OTHER PUBLICATIONS

Japanese Office Action issued Aug. 3, 2010 in counterpart Japanese Patent Application No. 2001-073243.

*Primary Examiner*—Marc A Patterson
(74) *Attorney, Agent, or Firm*—Sughrue Mion, PLLC (57) ABSTRACT

An optical film has a transparent film including light output portions distributed over one of opposite surfaces of the transparent film so as to make the total luminous transmittance and the haze of the optical film be set in a range of from 75 to 92% and in a range of from 4 to 20% respectively, the light output portions being constituted by concave or convex portions having optical path changing slopes each inclined at an inclination angle of from 35 to 48 degrees with respect to a film plane of the transparent film. A liquid-crystal display device has an optical film defined above, and a liquid-crystal display panel, wherein the optical film is disposed on one of opposite surfaces of the liquid-crystal display panel so that a surface of the film in which the light output portions of the optical film are provided faces outward.

20 Claims, 2 Drawing Sheets

FOREIGN PATENT DOCUMENTS

| | | |
|---|---|---|
| EP | 1 126 312 A2 | 8/2001 |
| EP | 1 154 306 A1 | 11/2001 |
| JP | 55070816 * | 5/1980 |
| JP | 5-158033 | 6/1993 |
| JP | 11-232920 A | 8/1999 |
| JP | 11-260132 A | 9/1999 |
| JP | 2000-56138 A | 2/2000 |
| JP | 2000-147499 | 5/2000 |
| JP | 2000-251515 A | 9/2000 |
| WO | 95/07435 A1 | 3/1995 |

\* cited by examiner

OPTICAL FILM AND LIQUID-CRYSTAL DISPLAY DEVICE

The present application is based on Japanese Patent Application No. 2001-073243, which is incorporated herein by reference.

BACKGROUND OF THE INVENTION

1. Field of the Invention

The present invention relates to an optical film by which the optical path of light incident on a side surface of a liquid-crystal display panel is changed to a viewing direction efficiently to thereby make it possible to form a liquid-crystal display device which is thin in thickness and light in weight with display bright, little in disorder of an image and easy to view both in an external light mode and in an illumination mode.

2. Description of the Related Art

As a reflection type liquid-crystal display device which can be used both in an external light mode and in an illumination mode, there has been heretofore known a device in which an optical film having light output portions constituted by fine prisms is stuck onto a visual side surface of a liquid-crystal display panel so that light incident on a side surface of the panel from a light source disposed on the side surface of the panel and transmitted inside the panel is reflected by the light output portions of the optical film to thereby illuminate the liquid-crystal display panel (Unexamined Japanese Patent Publication No. 2000-147499). That is, a system thin in thickness and light in weight for illuminating a liquid-crystal display panel has been achieved by use of an optical film further thinner than a side liquid-guide plate which was used in the related art.

Further, bright display has been achieved by the optical film excellent in directivity of illumination light compared with a related-art reflection type liquid-crystal display device (Unexamined Japanese Patent publication No. Hei. 5-158033) in which light incident on a side surface is totally reflected toward a liquid crystal layer side through a visual side transparent substrate of a liquid-crystal cell and reflected by a roughened surface type reflection plate disposed on a rear surface of the device to thereby form display light. Incidentally, it is difficult to effectively use the reflection from the roughened surface type reflection plate for display because illumination light exits in a direction largely inclined to a frontal direction of the liquid-crystal display panel.

In an LCD (liquid-crystal display device) using the related-art optical film having light output portions constituted by fine prisms, particularly in a front light system for viewing a display image through the optical film disposed on the visual side, there was however a problem that display was dark and contrast was low.

SUMMARY OF THE INVENTION

An object of the invention is to develop an optical film by which the optical path of light incident on a side surface of a liquid-crystal panel is changed to a viewing direction efficiently to thereby make it possible to form a liquid-crystal display device thin in thickness and light in weight with display bright and easy to view both in an external light mode and in an illumination mode.

The invention provides an optical film having a transparent film including light output portions distributed over one of opposite surfaces of the transparent film so as to make the total luminous transmittance and the haze of the optical film be set in a range of from 75 to 92% and in a range of from 4 to 20% respectively, the light output portions being constituted by concave or convex portions having optical path changing slopes each inclined at an inclination angle of from 35 to 48 degrees with respect to a film plane of the transparent film. Further, the invention provides a liquid-crystal display device having the optical film, and a liquid-crystal display panel, wherein the optical film is disposed on one of opposite surfaces of the liquid-crystal display panel so that a surface of the optical film in which the light output portions are provided faces outward.

According to the invention, when a light source is disposed on a side surface of a liquid-crystal display panel to which the optical film is bonded, the optical path of light emitted from the light source and entering the panel can be changed toward the film surface opposite to the surface having the light output portions by the optical path changing slopes of the light output portions and in a direction of a line normal to the panel with good directivity, so that liquid-crystal display can be achieved in an illumination mode. Also when the optical film is disposed on the visual side of the panel to form a front light system, external light can be made to enter the panel efficiently, and when the system is formed so that the incident light is inverted by a reflection layer disposed in a predetermined position, liquid-crystal display can be achieved in an external light mode. As a result, it is possible to form a transmission type or reflection type liquid-crystal display device which is excellent in reduction in thickness and weight, and which is bright, little in disorder of an image and excellent in display quality such as contrast both in an external light mode and in an illumination mode.

Features and advantages of the invention will be evident from the following detailed description of the preferred embodiments described in conjunction with the attached drawings.

DETAILED DESCRIPTION OF THE PREFERRED EMBODIMENTS

Figure 1:
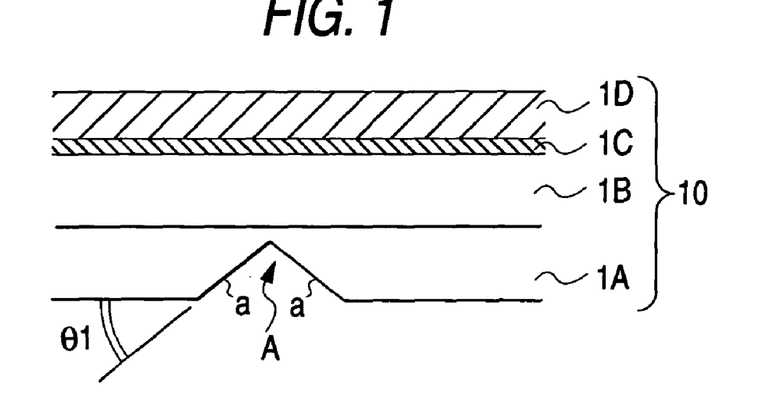
FIG. 1 is a side view for explaining an example of an optical film.
Figure 2:
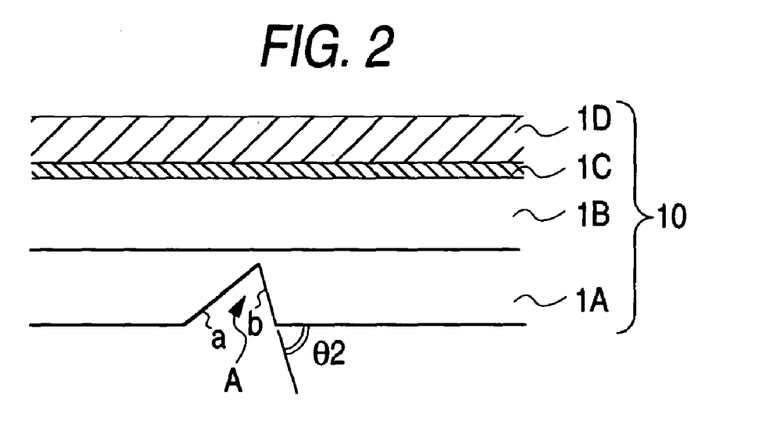
FIG. 2 is a side view for explaining another example of the optical film.

An optical film according to the invention having a transparent film including light output portions distributed over one of opposite surfaces of the transparent film so as to make the total luminous transmittance and the haze of the optical film be set in a range of from 75 to 92% and in a range of from 4 to 20% respectively, the light output portions being constituted by concave or convex portions having optical path changing slopes each inclined at an inclination angle of from 35 to 48 degrees with respect to a film plane of the transparent film. Examples of the optical film are shown in FIGS. 1 and 2. FIGS. 1 and 2 are side views each showing a cross section of each of the light output portions (optical path changing slopes) in the optical film. In each of FIGS. 1 and 2, the optical film (transparent film) 10 includes light output portions A having optical path changing slopes a. The reference numeral 1C designates a bonding layer; and 1D, a release film. Although FIGS. 1 and 2 show the case where a base material film 1B is used in the condition that a light output portions-forming layer 1A is attached to the base material film 1B, the invention may be applied also to the case where a single layer having the light output portions-forming layer is used alone without using any based material film.

Figure 6:
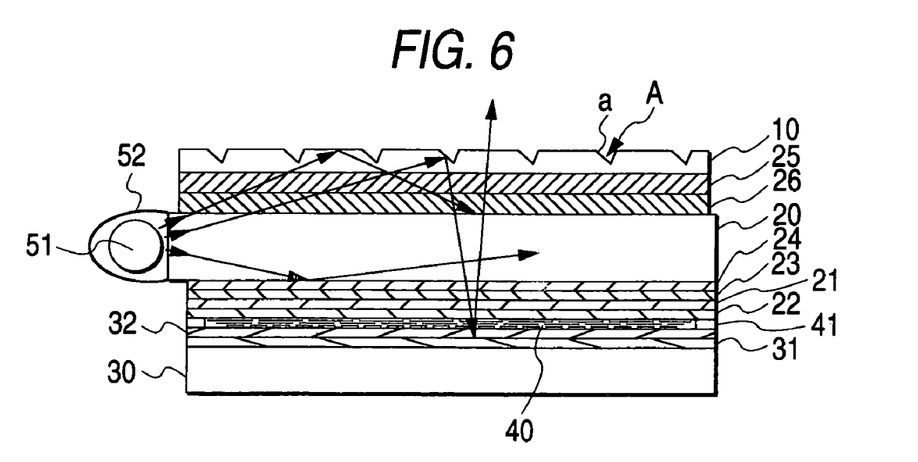
FIG. 6 is a side view for explaining a reflection type liquid-crystal display device.

As shown in FIG. 6, the optical film 10 is disposed in a direction along a panel plane of a liquid-crystal display panel having a light source 51 on a side surface of the panel so that the surface of light output portions-forming layer 1A of the optical film 10 faces outward. The optical film 10 is provided so that light incident on the side surface of the panel from the light source or transmitted light thereof is reflected by the optical path changing slopes a so that the optical path of the light is changed toward a rear surface of the transparent film 10 opposite to the light output portions-forming surface of the transparent film 10 and, accordingly, in a viewing direction of the liquid-crystal display panel. The reflected light finally exits from the transparent film so that the outgoing light can be used as illumination light (display light) of the liquid-crystal display panel.

The transparent film can be made of one member or two or more members selected from the group of suitable materials exhibiting transparency to a wavelength region of light made incident on the transparent film from a light source. Incidentally, examples of the materials used in a visible light region include: transparent resins represented by acrylic-based resin, polycarbonate-based resin, cellulose-based resin and norbornene-based resin; and curable resins polymerizable by heat or by radial rays such as ultraviolet rays or electron rays.

The preferred refractive index of the transparent film from the point of view to improve the efficiency of incidence of light onto the optical path changing slopes to thereby obtain a liquid-crystal display device with display excellent in brightness and uniformity of brightness is equal to or higher than that of the liquid-crystal display panel, particularly that of each of the panel substrates. Particularly, the preferred refractive index is not lower than 1.49, particularly not lower than 1.52. On the other hand, from the point of view to suppress surface reflection in the case where a front light system is formed, it is preferable that the refractive index is not higher than 1.6, particularly not higher than 1.56, more particularly not higher than 1.54. Incidentally, the refractive index is generally based on a D line when light is in a visible light region. The refractive index, however, need not be limited to the range as described above but may be set in accordance with the wavelength region of incident light when the wavelength region of incident light has specificity (this rule applies hereunder).

The preferred transparent film from the point of view to suppress luminance unevenness and color unevenness to obtain a liquid-crystal display device little in display unevenness is a transparent film exhibiting no or little birefringence, particularly having an average in-plane retardation of 30 nm or smaller. When a transparent film having such a small retardation is used, the state of polarization of incident light can be kept good to be favorable for prevention of the display quality from being deteriorated in the condition that the incident light is linearly polarized by a polarizer.

The preferred average in-plane retardation in the transparent film from the point of view to prevent display unevenness is not larger than 20 nm, particularly not larger than 15 nm, more particularly not larger than 10 nm. It is further preferable that variation in the retardation in accordance with the place is as small as possible. From the point of view to suppress internal stress easily generated in the transparent film by a bonding process to thereby prevent the retardation from being generated by the internal stress, it is further preferable that the transparent film is made of a material having a small photoelastic coefficient.

In addition, it is preferable from the point of view of prevention of display unevenness that the average thickness wise retardation of the transparent film is not larger than 50 nm, particularly not larger than 30 nm, more particularly not larger than 20 nm. Such a low-retardation transparent film can be formed by a suitable method such as a method of removing internal optical distortion of an existing film by annealing the existing film. The preferred method for forming such a low-retardation transparent film is a casting method. Incidentally, it is preferable that the retardation in the transparent film is based on light in a visible light region, particularly light with a wavelength of 550 nm.

The transparent film is generally formed as a single layer film but may be formed as a laminate of one kind or different kinds of materials. The thickness of the transparent film can be determined suitably without any particular limitation. From the point of view of reduction in thickness and weight, it is preferable that the thickness of the transparent film is set to be in a range of from 5 to 500 µm, particularly in a range of from 10 to 300 µm, more particularly in a range of from 20 to 100 µm. When the thickness of the transparent film is set to be in this range, sizing can be performed easily by a punching process or the like.

Light output portions A for obtaining this exit characteristic are provided on one of opposite surfaces of the transparent film to thereby form an optical film. As shown in FIGS. 1 and 2, the light output portions A are constituted by concave or convex portions having optical path changing slopes a each inclined at an inclination angle $\theta_1$ of from 35 to 48 degrees with respect to a film plane of the transparent film. Incidentally, in FIG. 1, by way of example, each of the light output portions A has two optical path changing slopes a shaped like two sides of an isosceles triangle in section. On the other hand, in FIG. 2, by way of example, each of the light output portions A has an optical path changing slope a inclined at an inclination angle $\theta_1$ of from 35 to 48 degrees with respect to the film plane, and a steep slope b inclined at a large inclination angle $\theta_2$ with respect to the film plane, the two slopes being shaped like two sides of an approximate triangle in section.

In such a configuration, the optical path of light incident on a side surface of a liquid-crystal display panel from a light source disposed on the side surface or the optical path of transmitted light of the incident light is changed toward the rear surface (opposite to the surface having the light output portions) of the transparent film by the optical path changing slopes a so that light excellent in directivity in a direction of a line normal to the liquid-crystal display panel can be made to exit from the transparent film with good efficiency of utilizing light emitted from the light source. When the optical path of the light is changed by the optical path changing slopes each having an inclination angle lower than 35 degrees, and the light is then reflected by a reflection plate disposed on the back side (opposite to the visual side) of the liquid-crystal display panel, the angle of display light exiting from the panel on the basis of the reflected light exceeds 30 degrees to thereby result in a disadvantage in visibility. On the other hand, if the inclination angle of each of the optical path changing slopes is higher than 48 degrees, total reflection cannot be performed and light leakage from the slopes occurs easily to thereby result in deterioration in light-utilizing efficiency. Incidentally, discrimination between the concave portions and the convex portions is based on whether the light output portions are depressed (as grooves) in the optical film or whether the light output portions are protruded (as peaks) from the optical film.

When the reflection system using the optical path changing slopes as described above is replaced by a scattering reflection system using an optical film having a roughened surface, light can be hardly reflected in a vertical direction. As a result, light is made to exit from the liquid-crystal display panel in a direction largely inclined with respect to the frontal direction, so that liquid-crystal display becomes dark and contrast becomes low. From the point of view to totally reflect light by the optical path changing slopes efficiently to make the light exit from the rear surface of the transparent film in a direction of a line normal to the film plane with good directivity to illuminate the liquid-crystal display panel efficiently to thereby achieve liquid-crystal display bright and easy to view, it is preferable that the inclination angle θ1 of each of the optical path changing slopes is in a range of from 38 to 45 degrees, particularly in a range of from 40 to 43 degrees.

As described above, the optical path changing slopes a are provided so that incident light from the light source in an illumination mode is reflected toward the rear surface of the transparent film to thereby change the optical path of the light. When the light output portions having such optical path changing slopes are distributed over a surface of the transparent film so that the total luminous transmittance is in a range of from 75 to 92% and the haze is in a range of from 4 to 20%, there can be obtained a surface light source in which the optical path of light incident on a side surface from the light source is changed to illuminate the liquid-crystal display panel efficiently. From the point of view to achieve liquid-crystal display bright and excellent in contrast, it is preferable that the optical film has the total luminous transmittance in a range of from 80 to 91% and the haze to be not larger than 15%, particularly to be not larger than 12%.

The characteristic such as total luminous transmittance and haze can be achieved by controlling the size of each light output portion, or the distribution density of the light output portions. In this case, if the size is too large or if the density is too high, the probability that light transmitted inside the liquid-crystal display panel will become incident on the optical path changing slopes increases to be thereby favorable for illumination of the LCD, but, on the other hand, the probability that light reflected by a reflection plate on the rear surface will strike the light output portions when the reflected light used as illumination light is transmitted through the optical film again also increases. As a result, liquid-crystal display is disordered and contrast is lowered. This is caused by the fact that the excessively large size or excessively high density of the light output portions makes the total luminous transmittance of the optical film small and the haze thereof large. In addition, if the size of each light output portion is too large, the presence of the light output portions is apt to be recognized by an observer so that display quality deteriorates largely and the uniformity of illumination for the liquid-crystal display panel deteriorates. When the density of the light output portions is reduced in order to make light emission uniform, light emission is sparse so that dark and light vary widely.

On the other hand, if the size of each light output portion is too small or if the density of the light output portions is too low, the probability that light transmitted inside the panel will become incident on the optical path changing slopes decreases so that the quantity of light for illuminating the panel is reduced. As a result, liquid-crystal display becomes dark and contrast is lowered. This is caused by the fact that the shortage in size or density of the light output portions makes the total luminous transmittance of the optical film large and the haze thereof small. Accordingly, the total luminous transmittance and haze in the invention are provided for determining the size and distribution density of the light output portions in order to achieve good display quality. When, for example, the projected area occupied by the light output portions in the light output portions-forming surface of the transparent film is set to be in a range of from 1/100 to 1/8, particularly in a range of from 1/50 to 1/10, more particularly in a range of from 1/30 to 1/15, the total luminous transmittance and haze in the invention can be achieved.

Figure 3:
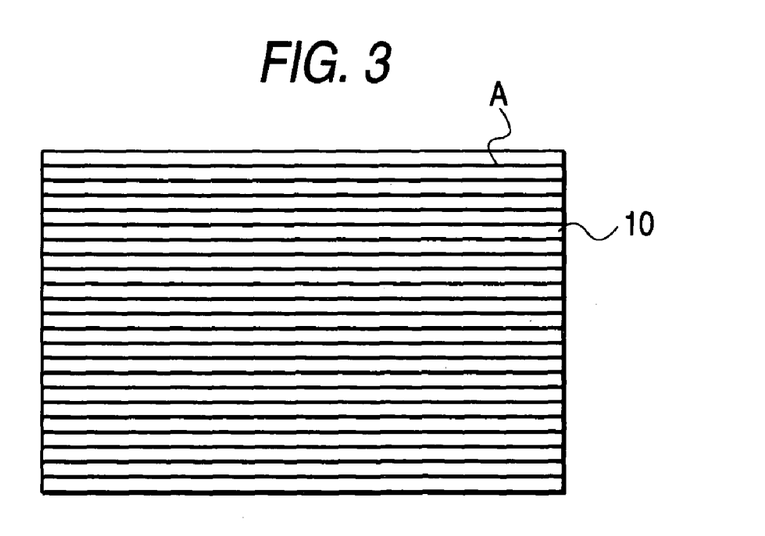
FIG. 3 is a plan view for explaining an example of light output portions.
Figure 4:
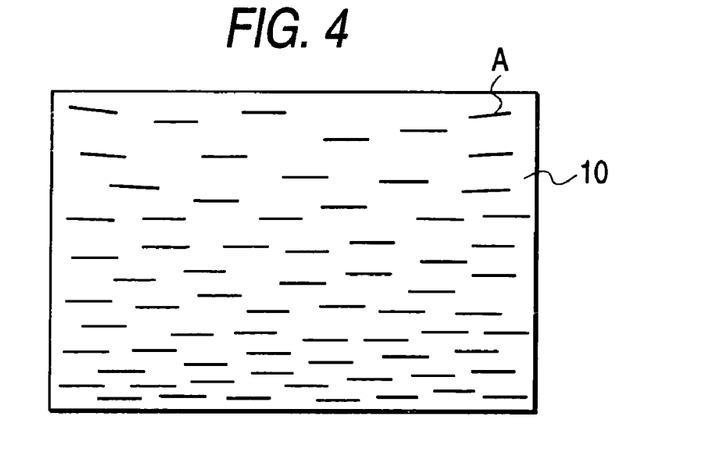
FIG. 4 is a plan view for explaining another example of the light output portions.
Figure 5:
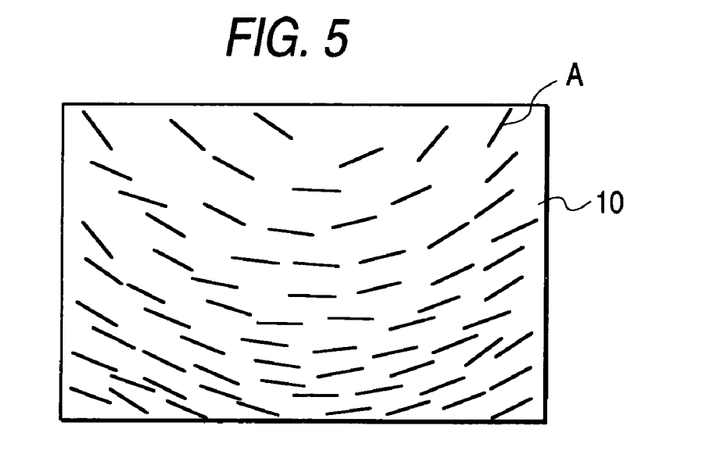
FIG. 5 is a plan view for explaining a further example of the light output portions.

As shown in FIGS. 3 to 5 which are plan views, by way of example, the light output portions may be constituted by concave or convex portions continuous from one side to the other side or may be constituted by concave or convex portions discontinuously intermittent. The light output portions may be distributed in parallel with one another as shown in FIG. 3, may be distributed at random as shown in FIG. 4 or may be distributed in the form of pits arranged on concentric circles with a virtual center as their centers as shown in FIG. 5, on the basis of the optical path changing slopes in the condition that the light output portions are continuous or discontinuous.

Each of the concave or convex portions constituting the light output portions may be formed into any suitable shape such as an approximate triangular shape, an approximate tetragonal shape or an approximate pentagonal shape in cross section with respect to the optical path changing slopes. From the point of view of reduction in visual sensation due to reduction in size, and efficiency in production, the light output portions are generally constituted by concave or convex portions each shaped like an approximate triangle in section as shown in FIGS. 1 and 2. Incidentally, the word "approximate" used in the approximate triangle or the like means that deformation such as changing of angles between sides, or rounding of angles formed between intersection points of sides is allowed.

The achievement of the characteristic such as the total luminous transmittance and haze can be determined suitably in accordance with the shape of each light output portion, the method of distributing the light output portions, and so on. Incidentally, when continuous light output portions are to be distributed in parallel with one another as shown in FIG. 3, it is preferable that the repetition pitch thereof is set to be not larger than 2 mm, particularly in a range of from 20 μm to 1 mm, more particularly in a range of from 50 to 500 μm, while the projected width of each of the optical path changing slopes on the film plane is set to be not larger than 40 μm, particularly in a range of from 3 to 20 μm, more particularly in a range of from 5 to 15 μm. Incidentally, the parallel distribution of the continuous light output portions may be performed so that the light output portions are parallel with one side of the optical film or arranged to cross one side of the optical film at an angle of not higher than 30 degrees. The latter case is effective in preventing moire from being caused by interference of the light output portions with pixels of the liquid-crystal display panel. Prevention of moire can be also performed by adjustment of the repetition pitch of the parallel arrangement. Accordingly, the repetition pitch may vary and need not be constant.

On the other hand, when discontinuous light output portions are to be distributed in parallel with one another or at random as shown in FIG. 4 or to be distributed in the form of pits on concentric circles with a virtual center as their centers as shown in FIG. 5, it is preferable from the point of view to achieve the characteristic such as total luminous transmittance and haze that the light output portions are formed so that the length of each of the optical path changing slopes in a direction of the long side thereof is not smaller than 5 times, particularly not smaller than 8 times, more particularly not smaller than 10 times as large as the depth or height of each of the concave or convex portions. It is further preferable that the length of each of the optical path changing slopes is set to be not larger than 200 μm, particularly not larger than 170 μm, more particularly in a range of from 10 to 150 μm, while the depth or height of each of the concave or convex portions is set to be not smaller than 2 μm, particularly not larger than 20 μm, more particularly not larger than 10 μm.

If the respective concave or convex portions become large, they may be viewed or the haze may increase. Accordingly, in consideration of the efficiency in reflection by the optical path changing slopes, it is preferable that the width of each of the light output portions is set to be in a range of from 3 to 20 μm, particularly in a range of from 5 to 15 μm, and that the length of each of the light output portions is set to be not smaller than 5 times, particularly not smaller than 8 times as large as the width thereof. Incidentally, the length is based on the length of each of the optical path changing slopes in a direction of the long side thereof, that is, based on the continuous direction of grooves or peaks of the concave or convex portions, and the depth or height is based on the light output portions-forming surface of the transparent film. Further, the width is based on a length in a direction perpendicular to the length, that is, based on a length in a direction of projection of the short side of each of the optical path changing slopes onto the film plane.

Incidentally, it is preferable that the surfaces which form the light output portions but do not satisfy the optical path changing slopes a with a predetermined inclination angle, for example, the steep slopes b opposite to the optical path changing slopes a, do not contribute to exiting of light incident on a side surface of the panel from the rear surface and do not have any influence on display quality and transmission/exiting of light as much as possible. Incidentally, if the inclination angle θ2 of each of the steep slopes with respect to the film plane is too small, the projected area of the steep slopes on the film plane becomes large. As a result, surface-reflected light by the steep slopes is apt to return to an observing direction to thereby disturb display quality in an external light mode using front light arrangement.

Accordingly, it is more favorable as the inclination angle θ2 of each of the steep slopes increases. In this case, the projected area of the steep slopes on the film plane can be reduced, so that lowering of the total luminous transmittance and increase of the haze can be suppressed. Moreover, the vertical angle between each of the optical path changing slopes and a corresponding one of the steep slopes can be also reduced, so that surface-reflected light can be reduced. Hence, the reflected light can be inclined in a direction of the plane (film plane) of the optical film, so that the influence on liquid-crystal display can be suppressed. From this point of view, the preferred inclination angle θ2 of each of the steep slopes is not smaller than 50 degrees, particularly not smaller than 60 degrees, more particularly in a range of from 75 to 90 degrees.

Each of the slopes which form the light output portions A may be formed into a suitable surface shape such as a linear surface shape, a bent surface shape, or a curved surface shape. The sectional shape of the light output portions A may be formed so that the inclination angles of the light output portions take a constant value on the whole surface of a sheet. Alternatively, the light output portions may be formed so that the size of the light output portions A increases as the location thereof becomes farther from the side surface on which the light is incident, in order to cope with absorption loss and attenuation of transmitted light due to the changing of the optical path to thereby attain uniformity of light emission on the optical film. The light output portions A may be arranged at intervals of a constant pitch. Alternatively, as shown in FIGS. 4 and 5, the light output portions A may be arranged so that the pitch becomes narrow gradually to increase the distribution density of the light output portions A as the location of the light output portions A becomes farther from the side surface on which the light is incident. Further, the light output portions A may be arranged at intervals of a random pitch so that uniformity of light emission on the optical film can be attained. The random pitch is also advantageous from the point of view to prevent moire from being caused by interference of the light output portions with pixels. Accordingly, the light output portions A may be constituted by a combination of concave portions or convex portions different in shape or the like as well as different in pitch.

The shape of intermittent ends of the concave or convex portions constituting the light output portions is not particularly limited. From the point of view to suppress the influence of reduction in light incident on the intermittent end portions, it is preferable that each of the concave or convex portions is provided as a surface inclined at an angle of not lower than 30 degrees, particularly not lower than 45 degrees, more particularly not lower than 60 degrees. Incidentally, from the point of view of prevention of the damage of the light output portions and the efficiency of incidence of light, the concave shape of the light output portion is preferred to the convex shape.

In the pit-like arrangement of the light output portions A as shown in FIG. 5, a point light source is disposed on a side surface of the liquid-crystal display panel. The optical path of light radiated from the point light source so as to be incident on the side surface or transmitted light thereof is changed by the optical path changing slopes a so that the rear surface of the optical film is made luminous as evenly as possible. Hence, light excellent in directivity in a direction normal to the liquid-crystal display panel is made to exit from the transparent film with good efficiency of utilizing light emitted from the light source. Accordingly, the pit-like arrangement of the light output portions A is preferably performed so that the point light source can be arranged easily and so that at least one virtual center can be formed on or outside an end surface of the transparent film. One virtual center may be formed or two or more virtual centers may be formed with respect to one film end surface or different film end surfaces.

The transparent film having the light output portions can be formed by a suitable method. Examples of the method include: a method of transferring a shape to a thermoplastic resin by hot-pressing the thermoplastic resin against a mold capable of forming a predetermined shape; a method of filling a mold capable of forming a predetermined shape with a hot-melted thermoplastic resin or with a resin fluidized by heat or by a solvent; and a method of performing a polymerizing process after filling a mold capable of forming a predetermined shape with a liquid resin polymerizable by heat or by radial rays such as ultraviolet rays or electron rays or after casting the liquid resin in the mold. The method is particularly advantageous in the case where a transparent film and light output portions are integrally molded to form a body having structural layers of the transparent film and the light output portions.

The preferred method of forming the transparent film having the light output portions is a method of adding the light output portions having optical path changing slopes onto a surface of the transparent film through a mold having a predetermined concave/convex structure. Examples of the preferred method include: a method in which a surface of a transparent film is coated with a curable resin polymerizable by ultraviolet rays, radial rays or the like, the coating layer is disposed close to the surface of the mold having the predetermined concave/convex structure therein and is cured by irradiation with ultraviolet rays, radial rays or the like and then the transparent film is separated from the mold and collected; and a method in which the surface of the mold having the predetermined concave/convex structure therein is filled with the curable resin, the transparent film is disposed closely onto the filler layer, the filler layer is cured by irradiation with ultraviolet rays, radial rays or the like and then the transparent film is separated from the mold and collected. Accordingly, in this case, as shown in FIGS. 1 and 2, a structural layer 1A of light output portions A provided separately from a transparent film 1B is attached to the transparent film 1B to thereby form one body.

In the description, in the latter method of adding the light output portions to the transparent film, the efficiency in exiting of light may be reduced greatly because of interface reflection if the refractive index difference between the structural layer of the light output portions to be added and the transparent film is large. To prevent the reduction of the efficiency in exiting of light, it is preferable that the refractive index difference between the transparent film and the structural layer of the light output portions is set to be as small as possible, particularly not larger than 0.10, more particularly not larger than 0.05. In this case, it is preferable from the point of view of the efficiency in exiting of light that the refractive index of the structural layer of the light output portions to be added is set to be higher than that of the transparent film. Incidentally, a suitable transparent material selected in accordance with the wavelength region of incident light as listed as materials for the transparent film can be used for forming the structural layer of the light output portions.

It is preferable that the front and rear surfaces of the optical film except the portion of the light output portions are flat surfaces as smooth as possible, particularly flat surfaces with an angular change in a range of ±2 degrees, more particularly flat surfaces with an angular change of zero degree. The angular change is preferably set to be not larger than 1 degree per 5 mm. When the front and rear surfaces are made flat as described above, a large part of the film surface can be provided as a flat surface with an angular change of not larger than 2 degrees. As a result, light transmitted inside the liquid-crystal display panel can be used efficiently, so that uniform exiting of light without disorder of an image can be achieved. This is also preferred from the point of view to attach the optical film to the liquid-crystal display panel easily.

As shown in FIGS. 1 and 2, the optical film may be formed so that a transparent bonding layer 1C is provided on the surface of the transparent film 1B opposite to the surface having the light output portions A as occasion demands. The bonding layer is provided for bonding the optical film to a support member such as a liquid-crystal display panel. The bonding process through the bonding layer is provided for improving the efficiency of reflection by the optical path changing slopes a of the light output portions A and, accordingly, for improving luminance on the basis of effective utilization of light incident on the side surface. It is preferable from these purposes that the refractive index difference between the transparent film and the bonding layer is small. From the point of view to suppress total reflection in the bonding interface between the bonding layer and the liquid-crystal display panel to improve the efficiency of incidence of light transmitted through the panel onto the optical film to thereby obtain a liquid-crystal display device with display bright and excellent in uniformity of brightness, it is preferable that the bonding layer has a refractive index which is not lower than a value lower by 0.07 than that of the transparent film and which is higher than or substantially equal to that of each of panel substrates of the liquid-crystal display panel.

Incidentally, if the refractive index of the bonding layer is lower than that of each of the panel substrates of the liquid-crystal display panel, light incident on the side surface is apt to be totally reflected when the incident light is transmitted. A resin plate or an optical glass plate is generally used as each of the panel substrates. In the case of a non-alkali glass plate, the refractive index thereof is generally in a range of from about 1.51 to about 1.52. Accordingly, when the non-alkali glass plate is ideally subjected to a bonding process through a bonding layer having a refractive index of not lower than 1.52, a large part of the transmitted light with the angle allowed to be made incident onto the optical film from the panel can be made incident on the optical film without total reflection in the bonding interface between the panel and the bonding layer. From the point of view to suppress the loss quantity of light which cannot exit due to a light-confining function based on the total reflection to thereby improve display luminance and uniformity of in-plane brightness, it is preferable that the refractive index difference in each interface between transmission type optical layers such as the bonding layer, the liquid-crystal display panel, and the transparent film is set to be not larger than 0.15, particularly not larger than 0.10, more particularly not larger than 0.05.

A suitable material satisfying this refractive index, such as an adhesive agent curable by heat or by irradiation with ultraviolet rays, radial rays or the like, can be used for forming the bonding layer without any limitation. From the point of view of handling property such as easy adhesion, and stress relaxing characteristic for suppressing generation of internal stress, an adhesive layer can be used preferably. An adhesive agent containing a suitable polymer as a base polymer can be used for forming the adhesive layer. Examples of the base polymer include a rubber-based polymer, an acrylic-based polymer, a vinyl-alkyl ether-based polymer, a silicone-based polymer, a polyester-based polymer, a polyurethane-based polymer, a polyether-based polymer, a polyamide-based polymer, and a styrene-based polymer. Particularly, an adhesive agent excellent in transparency, weather resistance and heat resistance can be used preferably. An example of the preferred adhesive agent is an acrylic-based adhesive agent in which a polymer mainly containing acrylic or metacrylic alkyl ester is used as a base polymer.

Further, the bonding layer may contain one member or two or more members selected from the group of suitable transparent particles so as to be provided as a light-diffusing bonding layer. Examples of the suitable transparent particles include inorganic particles and organic particles. The inorganic particles are made of silica, alumina, titania, zirconia, tin oxide, indium oxide, cadmium oxide, antimony oxide, etc. and may be electrically conductive. The organic particles are made of a crosslinked or non-crosslinked polymer. Incidentally, a release sheet may be preferably temporarily bonded to the bonding layer so that the bonding layer is covered with the release sheet before the adhesive layer is put into practical use for the purpose of anti-contamination against foreign matters.

On the other hand, the light output portions-forming surface of the optical film may be subjected to a non-glare treatment or an anti-reflection treatment in accordance with necessity for preventing viewing from being disturbed by surface reflection of external light. In addition, the light output portions-forming surface of the optical film may be subjected to a hard coat treatment for preventing the optical film from being injured. The optical film subjected to such a treatment can be preferably used particularly in a front light system. By conducting a non-glare treatment on a surface, the surface can be formed as a fine concave/convex structure. Various methods may be used in the non-glare treatment. Examples of the methods include: a surface roughening method such as a sandblasting method and an embossing method; and a method of coating a surface with a resin containing transparent particles of silica or the like as listed above. The anti-reflection treatment can be made by a method of forming a coherent vapor-deposited film. The hard coat treatment can be made by a method of coating a surface with a hard resin such as curable resin. Alternatively, the non-glare treatment, the anti-reflection treatment or the hard coat treatment can be made by a method in which films subjected to one kind or two or more kinds of the treatments are bonded to one another.

Further, the optical film may at least have a linear polarizing element which is bonded and laminated onto the surface of the transparent film opposite to the surface with the light output portions so that the optical film is disposed on a liquid-crystal display panel. The optical film of the type having such a linear polarizing element bonded and laminated in advance is favorable for stability of quality, and improvement of efficiency in production of the liquid-crystal display device. As the linear polarizing element, it is possible to use a suitable one without any particular limitation. From the point of view of obtaining display with a good contrast ratio based on the incidence of highly linearly polarized light, a polarizing element with a high degree of polarization can be preferably used. An example of the polarizing element is an absorption type polarizing film formed in such a manner that a dichromatic substance such as iodine or dichromatic dye is adsorbed into a hydrophilic polymeric film such as a polivinyl alcohol-based film, a partially formalized polivinyl alcohol-based film, or a partially saponified ethylene-vinyl acetate copolymer-based film, and then the film is oriented.

A transparent protective layer in accordance with the related art may be provided on one or each of opposite surfaces of the linear polarizing element to be used. A material excellent in transparency, mechanical strength, heat stability, and moisture sealability, and having a reflective index as listed in the transparent film can be preferably used for forming the transparent protective layer. Hence, the optical film can be provided to serve also as a transparent protective layer for protecting the linear polarizing element. In this case, the size and weight of the liquid-crystal display device can be reduced more greatly. In the optical film of the type having the linear polarizing element bonded and laminated in advance, a transparent bonding layer for bonding the optical film to another member may be provided on the surface of the laminate opposite to the transparent film, that is, on the surface in which the linear polarizing element is provided, in accordance with necessity. The bonding layer can be formed in accordance with the case for the transparent film.

In the optical film according to the invention, the optical path of light incident on the side surface from the light source or transmitted light thereof is changed by the light exit portions (optical path changing slopes) in a direction (of a normal line) excellent in perpendicularity favorable for viewing so that the light can exit with good light-utilizing efficiency. Moreover, the optical film can exhibit good transparency to external light. Hence, there can be formed various kinds of devices such as a reflection type or transmission type liquid-crystal display device which is bright and easy to view both in an external light mode and in an illumination mode, and which is thin in thickness and light in weight. FIG. 6 shows an example of the liquid-crystal display device. The device shown in FIG. 6 is a reflection type liquid-crystal display device which can be used both in an external light mode and in an illumination mode. In FIG. 6, the reference numerals 20 and 30 designate panel substrates of a liquid-crystal display panel; 40, a liquid-crystal layer; and 31, a reflection layer.

As shown in FIG. 6, the liquid-crystal display device can be formed by arrangement of the optical film 10 on one surface of the liquid-crystal display panel so that the surface of the optical film 10 having the light output portions A faces outward. In this case, as shown in FIG. 6, one light source 51 or two or more light sources 51 are arranged on one side surface or two or more side surfaces of the liquid-crystal display panel, particularly on one side surface or two or more side surfaces of the panel substrate 20 where the optical film 10 is disposed. Thus, an illuminating mechanism can be formed.

For the formation of the illuminating mechanism in the case of an optical film having light output portions A arranged in the form of pits as shown in FIG. 3, it is preferable that a point light source is disposed on a side surface of the liquid-crystal display panel on a perpendicular line containing a virtual center of the light output portions A arranged in the form of pits, from the point of view to achieve bright display by efficiently using incident light radiated from the point light source. For the arrangement of the point light source in accordance with the virtual center, a suitable measure such as a measure of protruding the side of the panel substrate 20 on which the point light source will be disposed as shown in FIG. 6 can be taken in accordance with whether the virtual center of the light output portions A is disposed on or outside the end surface of the optical film.

As the light source disposed on the side surface of the liquid-crystal display panel, it is possible to use a suitable one. Examples of the light source include: a point light source such as a light-emitting diode as described above; a linear light source such as a (cold or hot) cathode tube; an array in which such point light sources are set in a linear or planar array; and a combination of a point light source and a linear light guide plate through which incident light from the point light source is converted into a linear light source.

Further, from the point of view of the efficiency in exiting of light, it is preferable that the light source is disposed on a side surface of the panel so that the optical path changing slopes of the optical film face the light source. In the case where the optical path changing slopes are arranged, including the case of the pit-like arrangement, so that the optical path changing slopes face the light source as perpendicularly as possible, light incident on the side surface from the light source can be converted into light of a surface light source efficiently so that light can be emitted with high efficiency. Accordingly, in the case of an optical film 10 having two kinds of optical path changing slopes a as shown in FIG. 1, two light sources may be disposed on opposite side surfaces of the panel substrate. Further, in the case of pit-like arrangement, one point light source or two or more point light sources may be disposed in accordance with one virtual center or two or more virtual centers of the light output portions in the optical film.

The light source is provided so that viewing can be performed in an illumination mode in which the light source is switched on. In the case of a liquid-crystal display device which can be used both in an external light mode and in an illumination mode, the light source need not be switched on when viewing is performed in an external light mode using external light. Therefore, the light source is formed so as to be able to be switched on/off. As the method for switching on/off the light source, it is possible to use any method. Any one of related-art methods can be used. Incidentally, the light source may be of a different color emission type in which the color of emitted light can be changed. Further, different kinds of light sources may be provided so that different color emission can be made through the different kinds of light sources.

As shown in FIG. 6, the light source 51 may be provided with a suitable auxiliary unit such as a reflector 52 for enclosing the light source 51 to lead diverging light onto a side surface of the liquid-crystal display panel as occasion demands. That is, the light source 51 is combined with the suitable auxiliary unit to form a combination body. As the reflector, it is possible to use a suitable reflection sheet such as a resin sheet coated with a high-reflectance metal thin film, a white sheet, or a sheet of metal foil. The reflector can be used as a fixing unit serving also as a unit for enclosing the light source by a method of bonding end portions of the reflector to end portions of the panel substrate.

Generally, the liquid-crystal display device is formed by suitably assembling a liquid-crystal display panel functioning as a liquid-crystal shutter, a driver attached to the liquid-crystal display panel and a front light or backlight and by suitably assembling constituent parts such as a polarizer, a reflection layer or a compensating phase retarder as occasion demands. The invention is not particularly limited except that the optical film and the light source are used for forming an illuminating mechanism. The liquid-crystal display device can be formed in accordance with a related-art front light or backlight type device. Hence, the liquid-crystal display panel used is not particularly limited. As shown in FIG. 6, it is possible to use a suitable reflection type or transmission type panel in which liquid crystal 40 is enclosed between the panel substrates 20 and 30 through a sealing material 41 so that display light can be obtained through optical control by use of the liquid-crystal and a polarizer or the like provided in accordance with necessity.

Incidentally, specific examples of the liquid-crystal display panel include: a twisted or non-twisted liquid-crystal display panel such as a TN type liquid-crystal display panel, an STN type liquid-crystal display panel, an IPS type liquid-crystal display panel, an HAN type liquid-crystal display panel, an OCB type liquid-crystal display panel, and a VA type liquid-crystal display panel; a guest-host-based or ferroelectric liquid-crystal-based liquid-crystal display panel; and a light-diffusing liquid-crystal display panel such as an internal diffusion type liquid-crystal display panel. Further, as the method for driving liquid crystal, a suitable one such as an active matrix method or a passive matrix method may be used. Driving liquid crystal is generally performed through electrodes 21 and 31 provided on the inner sides of the panel substrates respectively as shown in FIG. 6.

The arrangement of a reflection layer is essential to a reflection type liquid-crystal display device. The position of arrangement of the reflection layer is optional. For example, the reflection layer may be provided inside the liquid-crystal display panel as shown in FIG. 6 or may be provided outside the liquid-crystal display panel. Hence, in FIG. 6, by way of example, the electrode 31 serves also as a reflection layer. The reflection layer can be formed as a suitable reflection layer according to the related art. Examples of the reflection layer include: a coating layer containing powder of a high-reflectance metal such as aluminum, silver, gold, copper or chromium in a binder resin; a layer of a metal thin film deposited by a vapor deposition method; a reflection sheet having the coating or deposited layer supported by a base material; a sheet of metal foil; a transparent electrically conductive film; and a dielectric multilayer film. When the liquid-crystal display device is provided as a transmission type one which can be used both in an external light mode and in an illumination mode, a suitable reflection film in the same manner as described above can be formed as a reflection layer disposed outside the optical film.

On the other hand, a transmission type liquid-crystal display device can be formed by arrangement of the optical film on the back side (opposite to the visual side) of the liquid-crystal display panel. In this case, when the reflection layer is provided on the back side (outside) of the optical film, light leaked from the optical path changing slopes of the light output portions can be reflected by the reflection layer to return toward the liquid-crystal display panel. As a result, the leaked light can be utilized for illuminating the panel, so that improvement of luminance can be attained. In this case, when the reflection layer is provided as a diffuse reflection surface, the reflected light can be diffused toward the frontal direction, that is, toward a direction more effective in viewing. In addition, when such a reflection layer is provided, the liquid-crystal display device can be used as transmission type one which can be used both in an external light mode and in an illumination mode.

When the reflection layer is disposed outside the liquid-crystal display panel as described above, the panel substrates and electrodes of the panel need to be formed as transparent substrates and transparent electrodes to make liquid-crystal display possible. On the other hand, when the electrode 31 serving also as a reflection layer is provided inside the liquid-crystal display panel as shown in FIG. 6, the visual side panel substrate 20 and electrode 21 need to be formed as a transparent substrate and a transparent electrode respectively to make liquid-crystal display possible. In this case, however, the back side panel substrate 30 need not be transparent as well as the reflection layer 31 need not be transparent. That is, the back side panel substrate 30 may be formed as an opaque body.

The thickness of each of the panel substrates is not particularly limited but may be determined suitably in accordance with the strength of enclosure of liquid crystal, the magnitude of the light source disposed, and so on. Generally, from the point of view of the balance between efficiency in light transmission and reduction in thickness and weight, it is preferable that the thickness is set to be in a range of from 10 μm to 5 mm, particularly in a range of from 50 μm to 2 mm, more particularly in a range of from 100 μm to 1 mm. The thickness of the panel substrate may vary so that a thickness difference is formed between the side where the light source is disposed and the side where the light source is not disposed.

For the formation of the liquid-crystal display panel, alignment films 22 and 32 such as rubbing films for aligning liquid crystal, a color filter 23 for achieving color display, a low-refractive-index layer 24, a linear polarizing element or polarizer 25, and a phase retarder 26, as shown in FIG. 6, may be provided as occasion demands. The alignment films are generally disposed so as to be adjacent to the liquid-crystal layer. The color filter is generally disposed between one of the panel substrates and a corresponding one of the electrodes. The polarizer is provided for controlling display light through linear polarization. The polarizer is disposed in a suitable position on one or each of the visual and back sides of the liquid-crystal display panel.

Incidentally, the polarizer is used in accordance with necessity and in accordance with the display type based on the liquid crystal in the liquid-crystal display panel. When, for example, the polarizer need not be used in the display type based on the guest-host-based liquid crystal, the liquid-crystal display device can be formed as a device having no polarizer. As the polarizer, it is possible to use a suitable one in accordance with the linear polarizing element. From the point of view of obtaining display with a good contrast ratio on the basis of incidence of highly linearly polarized light, a polarizer with a high degree of polarization can be used preferably.

Further, the low-refractive-index layer is provided so that light incident on the side surface from the light source is transmitted rearward in a direction of moving farther from the light source efficiently by interface reflection. As a result, light can be made efficiently incident on the optical path changing slopes a of the optical film 10 located in the rear, so that uniformity of brightness on the whole surface of the panel display screen can be improved. The low-refractive-index layer can be formed as a transparent layer made of a suitable low-refractive-index material formed from inorganic or organic compounds such as a fluorine compound. From the point of view of improving brightness of panel display, it is preferable that the low-refractive-index layer is disposed on the inner side of the panel substrate 20 on which the light source 51 is disposed as shown in FIG. 6, that is, on the surface of the substrate opposite to the surface on which the optical film is provided. From the point of view of improving brightness of panel display, it is preferable that the refractive index of the low-refractive-index layer is lower by 0.01 or more, particularly by a value of from 0.02 to 0.15, more particularly by a value of from 0.05 to 0.10 than that of the panel substrate.

For the formation of the liquid-crystal display device, the liquid-crystal display panel may be additionally provided with one suitable optical layer or two or more suitable optical layers such as a light-diffusing layer and a phase retarder, in accordance with necessity, as well as the non-glare layer. The light-diffusing layer is provided for the purposes of: enlargement of the display area by diffusing display light; uniformity of luminance by leveling light emission; increase in the quantity of light incident on the optical film by diffusing transmitted light inside the liquid-crystal display panel; and so on. Incidentally, the optical layer to be added may be integrally laminated on the optical film through an adhesive layer or the like in accordance with necessity so that the integrated body can be applied to the liquid-crystal display panel.

The light-diffusing layer can be provided by a suitable method using a coating layer or a diffusing sheet having a surface fine concave/convex structure in accordance with the non-glare layer. The light-diffusing layer may be provided with an adhesive layer containing transparent particles so that the light-diffusing layer serves also as a bonding layer. In this case, reduction in thickness of the liquid-crystal display device can be attained. One light-diffusing layer or two or more light-diffusing layers may be disposed in one suitable position or two or more suitable positions, for example, between the optical film and the visual side panel substrate.

The phase retarder is provided for the purposes of: enlargement of the viewing angle by optical compensation; prevention of coloring; and so on. As shown in FIG. 6, the phase retarder is generally disposed between the visual side or back side polarizer and a corresponding one of the panel substrates. A suitable phase retarder in accordance with the wavelength region may be used as a compensating phase retarder. The phase retarder may be formed as one retardation layer or as a superposed layer of two or more retardation layers. The retarter plate may be formed as a suitable plate, such as: a birefringent film obtained in a manner so that a film formed from any suitable transparent polymer is oriented by a suitable method such as a uniaxal or biaxial orienting method; an alignment film of a suitable nematic or discotic liquid-crystal polymer; or a film in which such an alignment layer is supported by a transparent substrate. Alternatively, the phase retarder may have a thicknesswise refractive index controlled plate under the function of heat-shrinking force of a heat-shrinkable film.

In the reflection type liquid-crystal display device shown in FIG. 6, viewing both in an external light mode and in an illumination mode is performed as follows. In an illumination mode in which the light source 51 is switched on, light exiting from the rear surface of the optical film 10 passes through the liquid-crystal display panel and is reflected by the reflection layer 31 as represented by the arrow in FIG. 6. Then, the reflected light passes through the liquid-crystal display panel in the reverse course and reaches the optical film. Thus, display light transmitted through other portions than the light output portions A is viewed. On the other hand, in an external light mode in which the light source is switched off, light entering through other portions than the light output portions in the light output portions-forming surface of the optical film 10 is reflected by the reflection layer 31, passes through the liquid-crystal display panel in the reverse course in the same manner as described above, and reaches the optical film. Thus, display light transmitted through other portions than the light output portions is viewed.

On the other hand, in the transmission type liquid-crystal display device, viewing both in an external light mode and in an illumination mode is performed as follows. In an illumination mode in which the light source is switched on, light exiting from the rear surface (the side opposite to the light output portions) of the optical film disposed on the back side enters the liquid-crystal display panel and is transmitted through the polarizer or the like. Thus, display light transmitted is viewed. In an external light mode in which the light source is switched off, external light entering through the visual side surface and passing through the polarizer or the like is transmitted through the liquid-crystal display panel and reaches the optical film. Then, light entering through other portions than the light output portions of the light output portions-forming surface of the optical film is inverted by the reflection layer provided on the back and transmitted inside the liquid-crystal display panel in the reverse course. Thus, display light is viewed.

In the invention, parts for forming the liquid-crystal display panel for forming the liquid-crystal display device may be wholly or partially integrally laminated and fixed to one another or may be disposed so as to be easily separable. From the point of view of suppressing interface reflection to prevent lowering of contrast, it is preferable that such parts are fixed to one another. It is preferable that at least the optical film and the liquid-crystal display panel are fixed and stuck to each other. A suitable transparent adhesive agent such as an adhesive agent can be used for the fixing process. Transparent particles may be contained in the transparent adhesive layer so that the transparent adhesive layer can be provided as an adhesive layer exhibiting a light-diffusing function.

In addition, the parts for forming the liquid-crystal display panel, particularly those parts on the visual side may be made to have ultraviolet absorptive power, for example, by a method of treating them with an ultraviolet absorbent such as a salicylic ester-based compound, a benzophenone-based compound, a benzotriazole-based compound, a cyanoacrylate-based compound, or a nickel complex salt-based compound.

Example 1

A transparent film of polycarbonate (PC) 60 μm thick was coated with an ultraviolet-curable acrylic-based resin about 100 μm thick by use of an applicator. The coating layer of the acrylic-based resin was brought into close contact with a mold processed into a predetermined shape in advance by a rubber roller so that excessive resin and air bubbles were extruded out. Then, the coating layer of the acrylic-based resin was cured by irradiation with ultraviolet rays from a metal halide lamp. Then, the PC film coated with the acrylic resin was separated from the mold and cut into a predetermined size. Then, the PC film was separated from the coating layer of the acrylic-based resin. Thus, a single layer type optical film was obtained. Incidentally, the refractive index of the ultraviolet-curable resin measured after curing was 1.515.

The optical film was 30 mm wide and 40 mm long. The optical film had light output portions constituted by concave portions which had optical path changing slopes and slopes opposite to the optical path changing slopes respectively. The optical path changing slopes were continuous in a direction of the width of the optical film and arranged in parallel with one another at intervals of a pitch of 210 μm in a direction of the length of the optical film. Each of the optical path changing slopes and a corresponding one of the slopes opposite to the optical path changing slopes formed two sides of a triangle in section. Incidentally, the projected width of each of the optical path changing slopes on a film plane of the optical film was 10 μm, the inclination angle of each of the optical path changing slopes was 42.5 degrees and the inclination angle of a corresponding one of the slopes opposite to the optical path changing slopes was about 75 degrees. Further, the area of flat surfaces constituted by other portions than the light output portions in the surface in which the light output portions were formed was not smaller than 12 times as large as the sum of the area of the optical path changing slopes and the area of the slopes opposite to the optical path changing slopes. Further, the measured total luminous transmittance and haze of the optical film were 89% and 7% respectively.

Example 2

An optical film was obtained in the same manner as in Example 1 except that a mold different in concave/convex shape was used in Example 2. The optical film had light out put portions each 100 μm long and 10 μm wide. Each of the light out put portions was constituted by a combination of an optical path changing slope having an inclination angle of 42 degrees and an opposite slope having an inclination angle of 75 degrees. The combination of the two kinds of slopes formed two sides of a triangle in section. The light output portions were arranged in parallel with one another at intervals of a pitch of 210 μm in a direction of the length of the optical film in the condition that the light output portions were intermittent in a direction of the width of the optical film. Incidentally, the measured total luminous transmittance and haze of the optical film were 85% and 10% respectively.

Comparative Example 1

An optical film of the type having large-size light output portions disposed densely was obtained in the same manner as in Example 1 except that a mold different in concave/convex shape was used in Comparative Example 1. The optical film had optical path changing slopes disposed at intervals of a pitch of 130 μm. The projected width of each of the optical path changing slopes on the film plane was in a range of from 20 to 25 μm. Each of the optical path changing slopes satisfied a predetermined inclination angle. The total luminous transmittance and haze of the optical film were 70% and 28% respectively.

Comparative Example 2

An optical film of the type having small-size light output portions disposed roughly was obtained in the same manner as in Example 1 except that a mold different in concave/convex shape was used in Comparative Example 2. The optical film had optical path changing slopes disposed at intervals of a pitch of 500 μm. The projected width of each of the optical path changing slopes on the film plane was 5 μm. Each of the optical path changing slopes satisfied a predetermined inclination angle. The total luminous transmittance and haze of the optical film were 93% and 3% respectively.

Comparative Example 3

An optical film of the type having optical path changing slopes each not satisfying a predetermined inclination angle was obtained in the same manner as in Example 1 except that a mold different in concave/convex shape was used in Comparative Example 3. In the optical film, the projected width of each of the optical path changing slopes on the film plane was 10 μm. The maximum inclination angle of the optical path changing slopes was 15 degrees. The inclination angle of slopes opposite to the optical path changing slopes was 55 degrees. The pitch of the optical path changing slopes was 210 μm. The total luminous transmittance and haze of the optical film measured were 90% and 6% respectively.

REFERENCE EXAMPLE

Magnesium fluoride was applied on to a polished non-alkali glass plate by vapor deposition to thereby form a low-refractive-index layer. Then, a plasma treatment was applied to the low-refractive-index layer in an argon atmosphere and an indium-tin oxide thin film was sputtered on the low-refractive-index layer to thereby form a transparent electrode. In this manner, a pair of transparent panel substrates were produced. As the visual side panel substrate on this occasion, substrates each having ten transparent electrodes 1 mm wide, 0.5 mm wide, 0.4 mm wide, 0.3 mm wide, 0.2 mm wide or 0.1 mm wide were formed.

Then, a polyvinyl alcohol film was formed on each of the transparent electrodes in the pair of substrates by spin coating. After the film was subjected to a rubbing treatment, the pair of substrates were disposed so that the transparent electrodes faced each other and so that the rubbing axes crossed each other perpendicularly. Then, a gap adjusting material made of spherical glass beads was disposed between the pair of substrates and the pair of substrates were fixed to each other by a sealing material. Then, a mixture solution containing 200 parts by weight of liquid crystal (E-7, made by BDH COMPANY) and 1 part by weight of a chiral agent (MC-32, made by MERCK & CO., INC.) was injected between the pair of substrates. Thus, a liquid-crystal cell was obtained.

A polarizer was stuck onto the outer side of the visual side transparent substrate in the liquid-crystal cell obtained as described above so that the rubbing axis was made coincident with the absorption axis. A polarizer having a reflection layer was stuck onto the outer side of the back side substrate so that the absorption axis of the back side polarizer crossed that of the visual side polarizer perpendicularly and so that the reflection layer was disposed outward. Thus, a reflection type TN liquid-crystal display panel in a normally white mode was obtained. An acrylic-based adhesive agent with a refractive index of 1.515 was used as an agent for bonding each of the polarizers. Then, a cold-cathode tube as an illumination light source was disposed on a side surface of the visual side substrate in the reflection type TN liquid-crystal display panel. The cold-cathode tube was covered with a reflection film having a film surface made of a silver thin film. Opposite ends of the reflection film were stuck to upper and lower end portions of the liquid-crystal display panel so that light was prevented from being leaked.

Evaluation Test

The optical film obtained in each of Examples 1 and 2 and Comparative Examples 1 to 3 was stuck to the visual side of the reflection type TN liquid-crystal display panel by use of an adhesive agent with a refractive index of 1.515 so that the light output portions-forming surface of the optical film faced outward and so that the direction of the length of the optical path changing slopes was parallel with the end surface on which the cold-cathode tube was disposed. Thus, a reflection type liquid-crystal display device was produced and disposed on a black board.

The liquid-crystal display device was observed while the cold-cathode tube was switched on in the condition that the liquid-crystal display panel was supplied with no voltage. Luminance in a position which was in the center portion of the liquid-crystal display device and which was far by 20 mm from the incident side surface was measured by a luminance meter (BM-7, made by TOPCON CORP.) Results of the measurement are shown in the following Table.

|  | Example 1 | Example 2 | Comparative Example 1 | Comparative Example 2 | Comparative Example 3 |
| --- | --- | --- | --- | --- | --- |
| Frontal Luminance (cd/m$^2$) | 24 | 22 | 16 | 4 | 4 |

In the Table, Examples 1 and 2 were superior in brightness to Comparative Examples 1 to 3. In terms of external appearance in light emission, brightness in each of Examples 1 and 2 was more uniform than that in each of Comparative Examples 1 to 3. In Comparative Example 1, when light reflected by the back side reflection layer passed through the optical film again, the haze was so large that the light could not exit toward the observer. Hence, in Comparative Example 1, display was dark because the light could not substantially contribute to illumination for the liquid-crystal display device. On the other hand, in Comparative Example 2, the total luminous transmittance of the film was high and the haze thereof was small so that the optical path of light from the light source could not be changed sufficiently. Hence, in Comparative Example 2, display was very dark. In addition, in Comparative Example 3, the direction of outgoing light was inclined largely so that the light could not contribute to illumination for the panel. Hence, in Comparative Example 3, display was dark.

On the other hand, display was observed in the condition that the liquid-crystal display panel was supplied with a certain voltage. As a result, even the 0.1 mm line could be clearly visible in Examples 1 and 2. Although the 0.1 mm line could be visible also in Comparative Examples 2 and 3, the line smaller than the 0.5 mm line could not be visible in Comparative Example 1. Therefore, it is obvious from the description that when the optical film according to the invention is stuck to a liquid-crystal display panel, the light source can be provided on a side surface of the liquid-crystal display panel to illuminate the panel without necessity of using any separately provided light guide plate to thereby make it possible to form a transmission type or reflection type liquid-crystal display device which is thin, lightweight and capable of being used both in an external light mode and in an illumination mode.

What is claimed is:

1. An optical film comprising a transparent film including a plurality of light output portions which are distributed intermittently over one of opposite surfaces of said transparent film so as to make total luminous transmittance and haze of said optical film be set in a range of from 75 to 92% and in a range of from 4 to 20% respectively, each of said light output portions including at least one optical path changing slope inclined at an inclination angle of from 35 to 48 degrees with respect to a film plane of said transparent film.

2. An optical film according to claim 1, wherein each of said light output portions have an approximate triangular, tetragonal or pentagonal cross-sectional shape.

3. An optical film according to claim 2, wherein each of said light output portions has said approximate triangular cross-sectional shape formed by said optical path changing slope and a slope inclined at an inclination angle of from 60 to 90 degrees with respect to said film plane.

4. An optical film according to claim 2, wherein a length of said optical path changing slope is not smaller than 5 times as large as a depth or height of a corresponding one of said light output portions.

5. An optical film according to claim 1, wherein a length of said optical path changing slope is not larger than 200 µm.

6. An optical film according to claim 1, wherein said light output portions are disposed in parallel with one another or at random or in a form of pits with respect to at least one virtual center.

7. An optical film according to claim 6, wherein said optical path changing slope is disposed so as to face said at least one virtual center located on or outside an end surface of said transparent film when said light output portions are disposed in the form of pits.

8. An optical film according to claim 1, wherein said light output portions have two optical path changing slopes-each inclined at an inclination angle of from 35 to 48 degrees with respect to said film plane of said transparent film.

9. An optical film according to claim 1, wherein said transparent film includes a transparent bonding layer disposed on the other surface of said transparent film opposite to the surface on which said light output portions are provided.

10. An optical film according to claim 1, wherein a linear polarizing element is bonded and laminated at least on the other surface of said transparent film opposite to the surface on which said light output portions are provided.

11. A liquid-crystal display device comprising:
an optical film comprising a transparent film including a plurality of light output portions which are distributed intermittently over one of opposite surfaces of said transparent film so as to make total luminous transmittance and haze of said optical film be set in a range of from 75 to 92% and in a range of from 4 to 20% respectively, each of said light output portions including at least one optical path changing slope inclined at an inclination angle of from 35 to 48 degrees with respect to a film plane of said transparent film; and a liquid-crystal display panel; wherein said optical film is disposed on one of opposite surfaces of said liquid-crystal display panel so that a surface of said optical film in which said light output portions are provided faces outward.

12. A liquid-crystal display device according to claim 11, wherein each of said light output portions have an approximate triangular, tetragonal or pentagonal cross-sectional shape.

13. A liquid-crystal display device according to claim 12, wherein each of said light output portions has said approximate triangular cross-sectional shape formed by said optical path changing slope and a slope inclined at an inclination angle of from 60 to 90 degrees with respect to said film plane.

14. A liquid-crystal display device according to claim 12, wherein a length of said optical path changing slope is not smaller than 5 times as large as a depth or height of a corresponding one of said light output portions.

15. A liquid-crystal display device according to claim 11, wherein a length of said optical path changing slope is not larger than 200 μm.

16. A liquid-crystal display device according to claim 11, wherein said light output portions are disposed in parallel with one another or at random or in a form of pits with respect to at least one virtual center.

17. A liquid-crystal display device according to claim 16, wherein said optical path changing slope is disposed so as to face said at least one virtual center located on or outside an end surface of said transparent film when said light output portions are disposed in the form of pits.

18. A liquid-crystal display device according to claim 11, wherein said light output portions have two optical path changing slopes-each inclined at an inclination angle of from 35 to 48 degrees with respect to said film plane of said transparent film.

19. A liquid-crystal display device according to claim 11, wherein said transparent film includes a transparent bonding layer disposed the other surface of said transparent film opposite to the surface on which said light output portions are provided, said transparent bonding layer securing said transparent film to said liquid-crystal display panel.

20. A liquid-crystal display device according to claim 11, wherein said liquid crystal display panel includes a linear polarizing element which is bonded and laminated at least on the other surface of said transparent film opposite to the surface on which said light output portions are provided.

* * * * *